United States Patent
Laemmle et al.

(10) Patent No.: US 7,111,306 B1
(45) Date of Patent: Sep. 19, 2006

(54) MONIKER METHOD, APPARATUS, SYSTEM AND ARTICLE OF MANUFACTURE

(75) Inventors: Beat Laemmle, Abenberg (DE); Calvin Justis, deceased, late of Johnson City, TN (US); by Mary Christine Williams Justis, legal representative, Elizabethton, TN (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/506,640

(22) Filed: Feb. 18, 2000

(51) Int. Cl.
*G06F 9/00* (2006.01)

(52) U.S. Cl. ............... 719/319; 719/310; 719/316; 719/332

(58) Field of Classification Search ............ 709/319, 709/311, 316; 707/103; 719/310, 316, 319, 719/332
See application file for complete search history.

(56) References Cited

U.S. PATENT DOCUMENTS

| | | | | |
|---|---|---|---|---|
| 6,167,404 A | * | 12/2000 | Morcos et al. | ............ 707/102 |
| 6,363,433 B1 | * | 3/2002 | Nakajima | ............ 709/313 |
| 6,460,058 B1 | * | 10/2002 | Koppolu et al. | ............ 345/738 |
| 6,564,242 B1 | * | 5/2003 | Bonet et al. | ............ 709/201 |

* cited by examiner

*Primary Examiner*—William Thomson
*Assistant Examiner*—Andy Ho

(57) ABSTRACT

A moniker is provided that accesses already-running instances of objects that do not have a resistant state. In one aspect, the objects are associated with a programmable logic controller (PLC). The PLC may be a soft PLC that interfaces with a personal computer. A remote connection is provided for such that the moniker instantiates objects of PLCs remotely such as over the internet.

58 Claims, 10 Drawing Sheets

FIG. 2A

Running.idl

```
// Running.idl : IDL source for Running.dll
//
// This file will be processed by the MIDL tool to
// produce the type library (Running.tlb) and marshalling code.

import "oaidl.idl";
import "ocidl.idl";

[
        object,
        uuid(E7531917-289D-11D2-869F-080009DC2552),
        dual,
        helpstring ("IRunning Interface"),
        pointer_default (unique)
    ]
    interface IRunning : IDispatch
    [
        [id(1), helpstring("method RegisterInstanceName")] HRESULT RegisterInstanceName (BSTR bstr
ItemName, IUnknown * pUnk, long * lCookie);
        [id(2), helpstring("method UnregisterInstanceName")] HRESULT UnregisterInstanceName(long
lCookie);
    );
[
    uuid(E7531908-289D-11D2-869F-080009DC2552),
    version(1.0),
    helpstring ("Running 1.0 Type Library")
]
library RUNIINGLib
[
    importlib("stdole32.tib");
    importlib("stdole2.tib");

[
        uuid(E7531918-289D-11D2-869F-080009DC2552),
        helpstring("Running Class")
    ]
    coclass Running
    [
        [default] interface IRunning;
        interface IparseDisplayName;
    );
);
```

FIG. 2B

Running.rgs

```
HKCR
{
        Running.1 = s 'Running Class'
        {
                CLSID = s '{E7531918-289D-11D2-869F-080009DC2552}'
        }
        Running = s 'Running Class'
        {
                CLSID = s ;{E7531918-289D-11D2-869F-080009DC2552}"
        }
        NoRemove CLSID
        {
                ForceRemove {E7531918-289D-11D2-869F-080009DC2552} = s 'Running Class'
                {
                        val AppID = s '{E7531918-289D-11D2-869F-080009DC2552}'
                        ProgID = s 'Running.1'
                        VersionIndependantProgID = s 'Running'
                        ForceRemove 'Programmable'
                        InprocServer32 = s "%MODULE%"
                        {
                                val ThreadingModel = s 'Apartment'
                        }
                }
        }
        NoRemove AppID
        {
                NoRemove {E7531918-289D-11D2-869F-080009DC2552} = s 'Running Class'
                {
                        val DllSurrogate = s ''
                }
        }
}
```

FIG. 2C

```
// CRunning.h : Declaration of the CRunning    CRunning.h
#ifndef_RUNNING_H_
define_RUNNING_H_ include "resource.h"      // main symbols
/////////////////////////////////////////////////////////////////////////
// CRunning
class ATL_NO_VTABLE CRunning :
      public CComObjectRootEx<CComSingleThreadModel>,
      public CComCoClass<CRunning, &CLSID_Running>,
      public IDispatchImpl<IRunning, &IID_IRunning, &LIBID_RUNNINGLib>,
      public IParseDisplayName
{
public:
      CRunning()
      {
            ATLTRACE(_T("CRunning() constructor called\n"));
      }
      virtual -CRunning()
      {
            ATLTRACE(_T("CRunning() destructor called\n"));
      }
DECLARE_REGISTRY_RESOURCEID(IDR_RUNNING)
BEGIN_COM_MAP(CRunning)
      COM_INTERFACE_ENTRY(IRunning)
      COM_INTERFACE_ENRTY(IDispatch)
      COM_INTERFACE_ENTRY(IparseDisplayName)
END_COM_MAP()
/////////////////////////////////////////////////////////////////
//IParseDisplayName method
      STDMETHODIMP ParseDisplayName(IBindCtx *pbc
                                    ,LPOLESTR pszDisplayName
                                    ,ULONG *pchEaten
                                    ,IMoniker **ppmkOut
                                    );
protected:
      const wchat_t* ProgID() { return L"Running"; }
   const wchar_t* VersionIndependantProgID() { return L"Running.1"; }
// IRunning
public:
      STDMETHOD(RegisterInstanceName) (long lCookie);
      STDMETHOD(UnregisterInstanceName) BSTR bstrItemName, IUnknown * pUnk, long * lCookie);
};
#endif //_RUNNING_H_
```

FIG. 2D

```
// CRunning.cpp : Implementation of CRunning
#include "stdafx.h"
#include "Running.h"
#include "CRunning.h"

#define BAD_POINTER_RETURN(p) if(!P)return E_POINTER
#define BAD_POINTER_RETURN_OR_ZERO(p) if(!P)return E_POINTER; else *p = 0
#define SIZE_OF_STRING(p) !p ? 0 : ((wcslen(p) * sizeof(wchar_t)) + sizeof(wchar_t))

#define OLE_MAXNAMESIZE 256
/////////////////////////////////////////////////////////////////////
// CRunning
STDMETHODIMP CRunning::RegistrationInstanceName(BSTR bstrItemName, IUnknown * pUnk, long * lCookie)
{
    AFT_MANAGE_STATE(AfxGetStaticModuleState())
    // TODO: Add your implementation code here
    ATLTRACE(_T("CRunning::RegisterInstanceName called\n"));
    HRESULT hr = E_FAIL;
    LPRUNNINGOBJECTTABLE prot = NULL;

hr = GetRunningObjectTable(0,&prot);
    if(SUCCEEDED(hr))
    {
        LPMONIKER     ppmk = NULL;

hr = CreateItemMoniker(NULL,bstrItemName,&ppmk);
        if(SUCCEEDED(hr))
        {
            hr = prot->Register(0
                                        ,pUnk
                                        ,ppmk
                                        ,(unsigned long *)lCookie
                                        );
            if(SUCCEEDED(hr))
            {
                TRACE(_T("CRunning::RegisterInstanceName register succeeded cookie is %x\
n"),(unsigned long*)*lCookie);
            }
            else
            {
                TRACE(_T("CRunning::RegisterInstanceName register failed %x \n"),hr);
            }
            ppmk->Release();
        }
        else
        {
            TRACE(_T("CRunning::RegisterInstanceName CreateItemMoniker failed %x \n"),hr);
        }
        prot->Release();
    }
    else
    {
        TRACE(_T("CRunning::RegisterInstanceName get ROT failed %x \n"),hr);
    }
    return hr;
}
STDMETHODIMP CRunning::UnregisterInstanceName (long lCookie)
{
    AFX_MANAGE_STATE(AfxGetStaticModuleState())
    // TODO: Add your implementation code here
    HRESULT hr = E_FAIL;
```

FIG. 2E

```cpp
                                    CRunning.cpp
        if(lCookie)
        {
                LPRUNNINGOBJECTTABLE    prot = NULL;
                hr = GetRunningObjectTable(0,&prot);
                if(SUCCEEDED(hr))
                {
                        hr = prot->Revoke((unsigned long) lCookie);
                        if(SUCCEEDED(hr))
                        {
                                TRACE(_T("CRunning::UnregisterInstanceName worked for cookie %x \n"),(unsigned long)lCookie);
                        }
                        else
                        {
                                ATLTRACE(_T("CRunning::UnregisterInstanceName Revoke failed\n"));
                        }
                        prot->Release();
                }
                else
                {
                        ATLTRACE(_T("CRunning::UnregisterInstanceName GetROT failed\n"));
                }
        }
        return hr;
}
STDMETHODIMP CRunning::ParseDisplayName(
        IBindCtx*       pbc,
        LPOLESTR        pwszDisplayName,
        ULONG*          pchEaten,
        IMoniker**      ppmkOut)
{
        AFX_MANAGE_STATE(AfxGetStaticModuleState())

ATLTRACE(_T("CRunning::ParseDisplayName() with %S/n"),pwszDisplayName);

BAD_POINTER_RETURN_OR_ZERO(ppmkOut);
        BAD_POINTER_RETURN_OR_ZERO(pchEaten);
        BAD_POINTER_RETURN(pbc);
        BAD_POINTER_RETURN(pwszDisplayName);
        BAD_POINTER_RETURN(pchEaten);
        ATLTRACE(_T("CRunning::ParseDisplayName() pointers OK!\n"));
        HRESULT hr =E_FAIL;

// set to max for now
        // need to change to fit MkParseEx
        if(*pwszDisplayName == L'@')
                * pchEaten = wcslen(L"@Running");
        else
                * pchEaten = wcslen(L"Running");
        // as far as i have been able to find oud
        // MkParse will pass the @, wrong!!
        // oh no!!! MkParseEx doesn't pass the @!!
        // we've got to fix this, so let's look for ":"

wchar_t * pwszInstance = wschr(pwszDisplayName,L':');
        // do we have an instance?
        if(pwszInstance)
        {
                ATLTRACE(_T("CRunning::ParseDisplayName() instance name %S/n"),pwszInstance);
                WCHAR           szItemName(OLE_MAXNAMESIZE);
                LPWSTR          lpszDest        = szItemName;
                LPWSTR          lpszSrc         = pwszInstance;
                int             cEaten = 0;
```

*FIG. 2F*

```
                                   CRunning.cpp
// eat delimiter characters until next token
while    (*lpszSrc != L'\0'&& (*lpszSrc == L'\\'|| *lpszSrc == L'/' ||
         *lpszSrc == L ':' || *lpszSrc == L'!' || *lpszSrc == L '('))
{
         ++lpszSrc;
         ++cEaten;
}
// parse next token in szItemName
while (*lpszSrc != L'\0' && *lpszSrc != L'\\' && *lpszSrc != L'/' &&
                *lpszSrc != L':' && *lpszSrc != L'!' && *lpszSrc != L'(' &&
                cEaten < OLE_MAXNAMESIZE-1)
{
         *lpszDest++ = *lpszSrc++;
         ++cEaten;
}
*pchEaten += cEaten;
*lpszDest = 0;
// find the running object
LPRUNNINGOBJECTTABLE     prot = NULL;
LPENMMONIKER                      penum = NULL;
LPMONIKER                            ppmk = NULL;
hr = CreateItemMoniker(NULL,szItemName,&ppmk);
ATLTRACE(_T("CRunning::ParseDisplayName() CreateItemMoniker %x\n"),hr);
if (SUCCEEDED(hr))
{
         // look in the running object table to find the gizmo
         // since we are a moniker provider we can't use
         // the bind context to get the ROT
         hr = GetRunningObjectTable(0, &prot);
         ATLTRACE(_T("CRunning::ParseDisplayName() GetRunningObjectTable %x\n"),hr);
         if (SUCCEEDED(hr))
         {        hr = prot->EnumRunning(&penum);
                  ATLTRACE(_T("CRunning::ParseDisplayName() EnumRunning %x\n"),hr);
                  if(SUCCEEDED(hr))
                  {
                           IMoniker     *     ppmkTest       = NULL;
                           IMoniker     *     ppmkResult     = NULL;
                           IUnknown     *     pUnk           = NULL;
                           BOOL               bFound         = FALSE;
                           while((penum->Next(1, &ppmkTest, NULL) == S_OK)&&(!bFound))
                           {
                                    hr = ppmk->IsEqual (ppmkTest);
                                    if(hr == S_OK) // not SUCCEEDED!!
                                    {
                                             TRACE(_T("CRunning::ParseDisplayName() we found it\n"));
                                             bFound = TRUE;
                                             hr = prot->GetObject (ppmkTest, &pUnk);
                                             if(hr == S_OK) // not SUCCEEDED!!
                                             {
                                                      TRACE(_T("CRunning::ParseDisplayName() we got it")');
                                                      hr = CreatePointerMoniker (pUnk, &ppmkResult);
                                                      if(SUCCEEDED(hr))
                                                      {
                                                               TRACE(_T("CRunning::ParseDisplayName() created pointer moniker\n"));
                                                               IParseDisplayName     * pParse = NULL;
                                             IMonikerpItem                         Moniker = NULL;
                                             ULONG                                 ucEaten
```

FIG. 2G

```
                                    CRunning.cpp
s correct
                                                    // we'll give him the part that i
s to with it
                                                    // and he can do whatever he want

*ppmkOut = ppmkResult;
                                                    // is there any string to parse?
                                                    if(*lpszSrc != L'\0')
                                                    {
(IID_IParseDisplayName, (void **)&Parse);
                                                            hr = pUnk->QueryInterface if(SUCCEEDED(hr))
                                                        {
eDisplayName(pbc, lpszSrc,&ucEaten, &pItemMoniker);
                                                                hr = t pParse->Pars if(SUCCEEDED(hr))
+= ucEaten;                                                 {
Result->ComposeWith(pItemMoniker, FALSE, ppmkOut);                *pchEaten
                                                                    hr = ppmk
DED(hr))                                                            if(SUCCEE
                                                                    {
                                                                        T
RACE(_T("CRunning::ParseDisplayName() It worked!!!\n"));
/ we can release the constituent elements                               /
/ of the composite                                                      /
pmkResult->Release();                                                   p
succeed or fail we can release the                                  )
oniker                                                          // if we
ker->Release();                                                 // item m
;                                                               pItemMomi
                                                            )
                                                            pParse->Release()
                                                        )
                                                    )
                                                )
                                            )
                                        ppmkTest->Release();
                                    )
                                    if(!bFound)
                                    {
                                        hr = E_FAIL;
                                    )
                                    penum->Release();
                                )
                                prot->Release();
                            )
                            ppmk->Release();
                        )
                    )
    return hr;
)
```

MONIKER METHOD, APPARATUS, SYSTEM AND ARTICLE OF MANUFACTURE

BACKGROUND OF THE INVENTION

1. Field of the Invention

The present invention relates to a method, system, apparatus and an article of manufacture for accessing objects or more particularly, to a moniker for locating, activating and (or) initializing specific instances of program objects particularly in a large computer system environment such as a network and (or) particularly in an environment where the object is not registered, i.e., does not have a persistent state.

2. Related Information.

A moniker is a "smart" name which contains information that is used to link to instances of other objects. Monikers are Object Oriented Programming (OOP) programs and a better appreciation of them will be realized from the following general discussion Object-Oriented Programming (OOP) is based on the ideology of using independent modular programs, called objects, as the building blocks for programming applications. The programming applications themselves may be considered composites of these objects. OOP prefers to think of a programming application as a client that invokes a particular object program, known as a class, as an instance of that object. The modularity of programming objects allows them to be instantiated, i.e., invoked, a plurality of times to create several run-time versions, i.e., objects, of the same object program. And therein lies the power of OOP— pieces of software (i.e., the object programs) are used, reused and interchanged between programming applications thereby avoiding redundancy, maintaining efficiency and freeing programmers to focus their attentions on the kernel, or core, of the programming application.

Windows NT™ (Windows New Technology) is a common operating system (O/S) from Microsoft™ that supports the OOP methodology. To support this methodology, Windows NT™ must provide a platform for executing OOP applications and accessing objects. In order to interface OOP application programs to the Windows NT™ operating platform, the O/S provides a set of functions, also referred to as methods, called the Application Programming Interface (API). The API is a language message format used by an application program to communicate with the Windows NT™ operating system (or other system program such as a database management system). APIs are implemented by writing function calls in the program that provide the linkage to a specific subroutine for execution.

Component Object Model (COM) is the component software architecture that the Windows NT™ operating system employs to access objects. Accessing objects in a common way on a system is paramount when one considers that objects, according to OOP methodology, are independent from the client. Thus, objects may be located anywhere on the system including program applications or persistent memory. To effect a common accessing scheme, COM defines a set structure for building program routines (objects) that can be called up and executed in the Windows™ environment. COM itself is written in an OOP language and objects therein are known as COM objects.

Programmers have evolved COM into a compound document technology known as Object Linking and Embedding (OLE) to handle the complex task accessing or embedding objects in applications or documents, called the container application. OLE, for example, allows an object such as a spreadsheet or video clip to be embedded into a document, called the container application. When the object is double clicked, the application that created it, called the server application, is launched in order to edit it. An object can be linked instead of embedded—in which case the container application does not physically hold the object, but provides a pointer to it. If a change is made to a linked object, all the documents that contain that same link are automatically updated the next time the user opens them. An application can be both client and server.

The present invention relates to accessing objects within the COM environment. In order to instantiate a COM class, the client must first grab hold of a pointer to a COM-compliant interface. The set of operations carried out to somehow retrieve a valid interface pointer to a live object is called binding. In the case where the client needs only a general instance of the class, this interface pointer is obtained by creating a new instance of the co-class through the well known CoCreateInstance( ) API provided by OLE, as demonstrated in the following code snippet:

```
IInterface* NewObject(clsid)
{
HRESULT hr;
IIntertace* pInterface = NULL;
// Error handling omitted
hr = CoCreateInstance(clsid, NULL, CSLCTX_ALL, IID_IInterface,
(void**)&pInterface);
if (SUCCEEDED(hr))
        return pInterface;
return NULL;
```

The function CoCreateInstance creates an instance of the identified class and receives a pointer to the IDispatch interface of that instance. The IDispatch interface allows for the invocation of methods that are bound to at run time.

The foregoing interface works well for instantiating objects. However, when the client needs to access an already-existing object (a specific instance), the CoCreateInstance function is not applicable. For example, in the case where an Excel™ application (client) links to a pre-stored Excel™ data file (specific instance), it will not do to instantiate a new object. Instantiating a new object creates a new version of that object—it does not access the specific instance.

Moreover, it is undesirable to employ the CoCreateInstance function because it requires the server to be actively involved in instantiating the relevant object. Recalling that the tenet of Object Oriented Programming is to establish independency between programs, it is unsatisfactory that the server be burdened with calling and passing parameters to the instantiation routine.

COM provides special programming objects called monikers that allow clients, such as an Excel™ application, to link specific instances of an object. In simplistic terms, a moniker is a smart name which stores that information which allows the client to locate and invoke the instance. In our Excel™ example, a call to the moniker that points to the Excel™ data file will automatically produce a pointer to the parent Excel™ application. In this case, the operating system will automatically launch the Excel™ application and link it to the Excel™ data file. The Excel™ application need not be concerned about the details of linking to the object.

Monikers, while useful, are limited because they operate within the COM environment. In particular, COM monikers call only those objects that are registered in the operating system. This is a problem because the objects themselves are responsible for registration. In the case where, for example, a peripheral element such as a PLC (Programmable Logic Controller) is connected to a personal computer (PC), the PLC has no conventional way in which to register itself with the operating system. In that case, the standard monikers are unable to provide a pointer to the clients of the operating system for linking to the PLC. This is particularly true for a PLC that is remotely connected.

Another problem is that monikers automatically instantiate the object whether or not the object is already running. In the PLC™ example, the moniker would cause the PLC to be automatically instantiated. This is very dangerous because it may cause an otherwise dormant PLC to come "alive" and activate machinery connected thereto. This could have disastrous results in a manufacturing environment.

There is needed a means by which already-running specific instances, particularly of the kind heretofore described, are linked to client applications that reside on an operating server particularly where the object has not registered itself with the operating system. It is important that any such means operate within the bounds of the ideology of maintaining independency between the servers and clients as proscribed by Object Oriented Programming.

OBJECTS AND SUMMARY OF THE INVENTION

It is an object of the present invention to access programming objects.

It is another object of the present invention to access specific instances of programming objects.

It is yet another object of the present invention to access unregistered specific instances of programming objects.

It is still another object of the present invention to access already-running programming objects.

It is quite another object of the present invention to access programming objects associated with a PLC.

It is further another object of the present invention to access programming objects remotely.

It is indeed another object of the present invention to maintain the object oriented programming methodology of independency of servers and objects.

In accordance with the foregoing objectives, the present invention provides means, method, apparatus, system and article of manufacture for accessing specific instances of already-running programming object(s). In one aspect of the present invention, there is provided a manner in which there is accessed a specific instance(s) associated with a PLC coupled to an operating system in the case where the specific instance is not registered with the operating system such that a server is not able to normally access the specific instances using a registration of the operating system. The invention, upon the determination that the specific instance is not registered, registers the specific instance such that the server is able to randomly access the specific instance.

In another aspect of the present invention, objects are accessed via remote access such as the internet, intra-net or other remote access. An additional aspect of the invention accesses objects while maintaining the methodology of programming independency characteristics of object-oriented programming.

These and other objects will be appreciated in light of the following description of the drawings wherein the numerals correspond to like elements.

BRIEF DESCRIPTION OF THE DRAWINGS

FIGS. 2A–2G are software listings of the present invention.

DETAILED DESCRIPTION OF THE PREFERRED EMBODIMENTS

Figure 1:
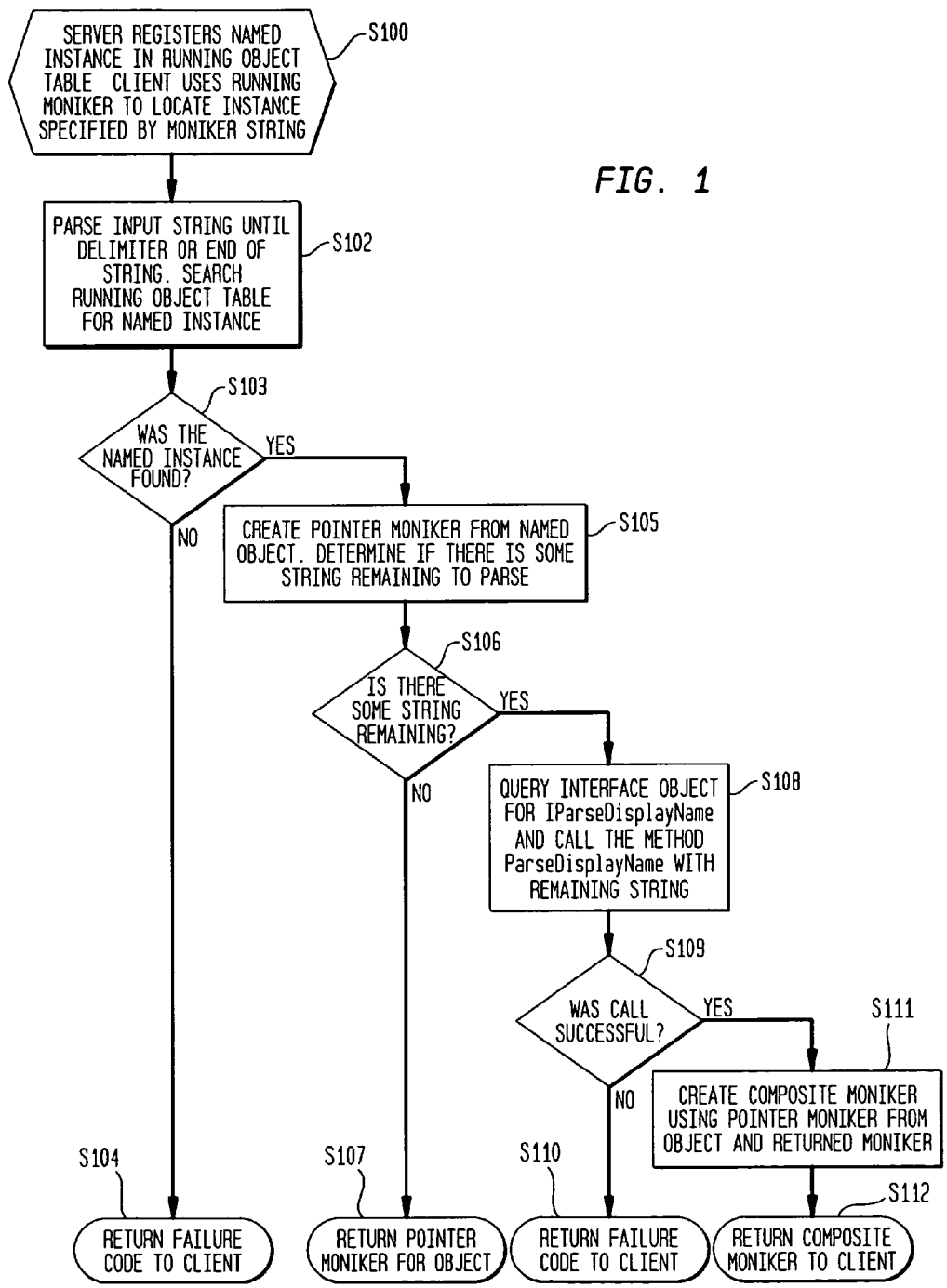
FIG. 1 is a flow diagram of the present invention.

The present invention relates to a method, system, apparatus and an article of manufacture for accessing computer programs. In a preferred mode, the present invention is practiced in the form of a moniker for locating, activating and (or) initializing program objects particularly in a large system environment and (or) particularly in an environment where the object does not necessarily have a persistent state. It will be appreciated by those skilled in the art that the invention may be practiced in another form. For that matter, this disclosure shall not be construed to limit the present invention to any specific environment (i.e., Microsoft™, Windows NT™, COM environment), but may be applied to any platform, environment or operating system. While the present invention has been described based on the C++ programming language, the disclosure shall not be understood to limit the invention to any particular computer programming language (C++, etc), but may include any language. The present invention may, moreover, be practiced not only as a method or process, i.e., computer program—but as firmware, that is, hardware implementation (Programmable Memory, Integrated Circuit), an article of manufacture (CD or DVD disc, etc.) encoded with software, or a machine or apparatus (processor controlled computer, etc.) as supported by the specific machine implementation set forth in the disclosure.

It is possible, using monikers, to access an already-running (specific instances) of an object. Monikers contain information that allows COM objects to be located, activated and initialized. Actually, monikers are themselves COM objects. From a more technical point of view, a moniker is a composite name for an object that includes a pointer to the object. Clients invoke a moniker by holding references to it in the form of pointers to the Imoniker interface.

The IMoniker interface includes a function (BindToObject) for binding the moniker to the object to which the pointer of the moniker points. Binding causes an object to be placed in a running state so that the services supplied by the object may be invoked. This interface contains a large number of other methods to cope with different situations, but the key one for this discussion is the method, BindToObject( ) shown here:

```
interface IMoniker : IPersistStream
{
HRESULT BindToObject([in] IBindCtx *pbc,
            [in] IMoniker *pmkToLeft,
            [in] REFIID riidResult,
            [out] void **ppvResult);
// other methods removed for clarity
```

The client invokes the BindToObject( ) function of IMoniker to execute the binding process. The precise implementation details are—as usual for COM—up to the object that implements IMoniker. But in principle, if the object happens to be already running, BindToObject( ) should be able to find it and return an interface pointer on it. If the object is crystallized in a persisted state on a storage medium, it is BindToObject( ) which ought to be able to locate the right server for the class it belongs to, launch this server and ask it to bring it back to life in memory, all without any aid on the client side. The resultant interface pointer of type riid (third parameter) is returned in ppvResult (fourth parameter), assuming that the process has run smoothly and flawlessly.

Besides the Imoniker interface, the COM specification allows monikers to be defined by a string of text, i.e., a string moniker, called the display name of the moniker. The display name is made up of two distinct parts separated by the: delimiter. The substring to the left of the : determines the type of moniker, while the substring to the right is highly instance-specific and furnishes a textural version of the state of the object.

However, the display name cannot be translated into a fully functional class instance in a single pass. The display name must first be parsed. This is done by calling the MkParseDisplayName( ) API (declared in objbase.h) that determines the type of moniker by converting the moniker prefix substring from a ProgId to a CLSID. After that, the IParseDisplayName function is called that first queries the class object of the moniker and, if the response is negative, querying a new instance of the coclass allocated for this purpose. After a valid pointer to IParseDisplayName is obtained, the function passes the entire display string to IparseDisplayName ::ParseDisplayName( ), which is supposed to do the hard parsing work and calls the IMoniker function described above that returns an appropriate moniker object.

Monikers save programmers time when coding various types of COM-based functions. The linked document, for example, contains a moniker that identifies its source, so when the user or program activates the linked object to edit it, the moniker is bound. Thus, it becomes possible to load the source into memory without any precise knowledge of where the linked object resides. This is particularly important as it frees clients from being burdened with locating objects.

The ability to access objects easily makes Monikers useful for instantiating classes within the OLE environment (Object Linking and Embedding). Again, OLE allows an object to be embedded into a document, called the container application. An object can be linked instead of embedded—in which case the container application does not physically hold the object, but provides a pointer to it. In any event, monikers are quite useful for instantiating objects within compound documents.

Platforms provide built-in moniker types that implement the most recurring binding algorithms. These are summarized briefly in the table below:

| Name | Special Requirements | Description |
| --- | --- | --- |
| Class Moniker | Windows NT 4.0+ | Binds to a class object |
| File Moniker | | Binds to an object persisted on file |
| Pointer Moniker | | Encapsulates a pointer to an active object in a moniker |
| Composite Moniker | | Combination of several monikers |
| Item Moniker | | Sub-object in a composite moniker |
| Java Moniker | Internet Explorer 4.0+ | Exposes the classes exported by the IE4 JVM |
| URL Moniker | Internet Explorer 3.0+ | Encapsulates a URL pointing to a distributed resource |
| ObjRef Moniker | Win98, Win95 with DCOM, WinNT 4.0 SP4+ | Encapsulates a pointer to an object running out-of-process in a moniker |
| Anti Moniker | | Nullifies other monikers in a composite |

However, the foregoing monikers require local parameter data to access a specific instance. For example, a specific instance of the class balloon is meaningless without the local parameter that indicates the specific color of this particular balloon. Typically, local parameters are accessed by clients in persistent memory, that is, memory that continues to exist after the program that created it is not available. Problematically, it is not so easy to obtain the persistent data—this is particularly true for large network systems where the persistent data may be located anywhere on the network.

This problem is compounded when it is considered that it is not always the case that objects are responsible for registering themselves on the Running Object Table (ROT). When a client desires to instantiate a specific instance, it fetches the pointer of the persistent data by first looking up the registered object on the ROT. In the case where the running object failed to register itself on the ROT, only that running object has the pointer to the persistent data and the client cannot instantiate that specific instance.

These problems may be better understood by analyzing the following file moniker construct. This file moniker is a moniker that binds to an object persisted on file. More specifically, the file moniker is encapsulated in the API call CoGetObject. Within this function, the file path is identified in a string (c:\MyDirectory\MyFile.ext). If the file is a compound document, that is, a document composed of more than one object, COM may use the API function call GetClassFile to retrieve the CLSID (the class ID—a unique number that identifies the type of the object) from the persistent data stored in the file.

Once the class is known, COM checks the ROT to determine if an instance with this persistent state has been registered as running. If the instance is registered, then COM returns the pointer of this object to the client. If the instance is not registered, then an instance of the object is instantiated and COM queries the object for a particular standard interface (named IPersistFile). If this is successful, the method Load is called with the filename. The object can then load the file and initialize its state. The string that is passed to CoGetObject can have other formats as those skilled in the art will appreciate.

In the case that the object is stored in a container, the OLE filelitem moniker, i.e., c:\MyDirectory\MyFile.ext!item1, is employed. The object named by the file moniker with the string "c:\MyDirectory\MyFile .ext" is a container that can hold some objects, one of which is named "item1". In this case, after the load function is called on the object (or the object has been retrieved from the running object table), the object is queried for the interface IParseDisplayName. If this call is successful then an Item moniker is returned to the COM and composed with the file moniker. The resulting composite moniker, i.e., the combination of the file and the item moniker, is returned to the client and the method BindToObject of the interface Imoniker is called on it.

The bind operation occurs in the reverse order. When the composite moniker is bound, its splits into two parts—the rightmost constituent moniker (the item moniker) and the remaining portion of the composite (in this case the file moniker). BindToObject is then called on the item moniker. The item moniker cannot resolve its name ("item1") without a container. It calls BindToObject on the moniker to the left asking for the interface IOleItemContainer and, if this call is successful, calls the method GetObject (passing its name as the parameter). Since the object named by the file moniker is a container that understands the string "item1", the object is retrieved and returned to the client. A file moniker string can have any number of items allowing the representation of arbitrarily complex hierarchies.

The analysis of the following string will be illuminative of the operation of the afore-described file moniker:

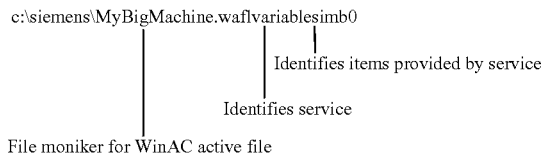

In the example string above, the file moniker uses the string "c:\siemens\MyBigMachine.waf" to locate the server in the ROT. When the object is located, it is queried for the interface IParseDisplayName. A file moniker is created for this object that will be used in the subsequent compose operations.

The ParseDisplayName method of the interface IParseDisplayName is called with the item name "variables" and if the operation is successful an item moniker is created which is then composed with the file moniker created above. The resulting object is then queried for the interface IParseDisplayName and the method ParseDisplayName is called with the item name "MBO". If this is successful, another item moniker is created for the string "MBO" and composed with the composite created in the previous operation. At this time, the string is completely consumed. The resulting composite moniker is returned to the client for binding.

The binding operation begins with the rightmost item moniker. The composite is traversed until reaching the file moniker, where GetObject is called successively with each item name. When the sequence is complete, the object representing MBO is returned to the client. This object can either support a default property containing the value and/or implement IDataObject. The client can also request only the service "variables" by using the moniker, "c:\siemens\MyBigMachine.waf\variables".

The Data.Ocx (a component of the SIEMENS product WinAC) would use this moniker to retrieve an IVar session object.

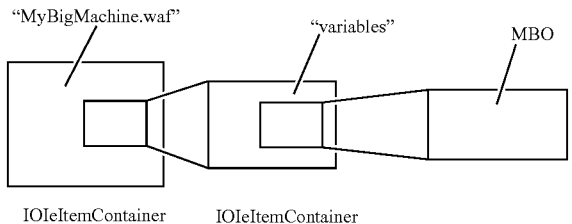

This naming convention can support any level of granularity. It would be possible, for example, to name elements in data blocks c:\siemens\MyBigMachine.waf\variables (i.e. idb51elt4).

Since the foregoing naming convention will support an arbitrarily complex hierarchy, it could be used to name devices and input/output (I/O) points in the field. As new services are added to the various WinAC™ components, no change would have to be made to existing clients to use them. All of the servers will support the same basic syntax for the moniker strings. However, since the servers themselves are moniker providers, each server can extend the syntax as needed.

A client may want to connect to a specific instance of an object that has no persistent state and therefore cannot register a File moniker. The moniker of the present invention resolves this problem. In summary, this moniker is a software component that allows a server to register an instance of an object in the ROT with a user-defined name. The user-defined name can be thought of as an item moniker. After an instance of an object is registered in the ROT, that instance is then accessible from any client. If a client wants to access the object, it uses the Running moniker to search the ROT for the instance and bind to it. A server, thus, can register any number of object instances, each with a different name. When a server's execution is terminated, it should unregister any object instance that it registered.

The steps of the present invention will now be described with reference to FIG. 1. The first step (S100) is to register the instance. This accomplished by calling the following methods provided in the IRunning interface:

HRESULT RegisterInstanceName (BSTR bstritemName, IUnknown*pUnk,long* ICookie);

HRESULT UnregisterinstanceName (long ICookie).

As a result of the function call, the server passes both a pointer to the instance and the desired name to the RegisterInstanceName method. If this call is successful, then a cookie is returned. The server caches the cookie, which is used when the object is destroyed as the parameter to the method UnregisterInstanceName. If a server fails (i.e., it crashes) to unregister the object upon its destruction, the ROT purges the object's moniker on the first attempt to access it.

The moniker of the present invention implements the standard interface IParseDisplayName (S102). A client can locate a named instance of an object by calling either GoGetObject or MkParseDisplayName with the following string "@Running:ObjectName". At this point, COM converts the ProgID "Running" to the CLSID using the API call CLSIDFromProgID. Next, the API call GoGetClassObject is used to instantiate the parser. The object is then queried for the IParseDisplayName interface. The method ParseDisplayName is called on that interface to parse the string (S103). If the requested object cannot be located in the ROT, an error is returned to the client (S104). At this time, a pointer moniker is created (S105) and returned to the client (S107). The client then calls BindToObject on the returned moniker. When a client is finished using the object it releases it.

If the object registered in the ROT supports the interfaces IParseDisplayName and IOleItemContainer, more complex operations are applied (S106). The moniker of the present invention is capable of querying the object for IParseDisplayName and calling the method ParseDisplayName with the name of an item (S108). If this call is successful (S109), the returned object can also be queried for IParseDisplayName. If not successful, a failure code is returned (S110). If the object supports this interface, the name of the object is used to create an item moniker which is composed (S111) with the moniker to the right.

The above steps can be continued recursively for an arbitrary complex hierarchy. Once all of the elements of the input string have been consumed, the resulting composite moniker is returned to the client for binding (S112). The bind process BindToObject is called with the interface IOleItemContainer, recursively calling the method GetObject until the composite moniker is consumed and the object is returned to the client.

The standard moniker process uses the Microsoft defined interfaces, IOleItemContainer and IParseDisplayName, and creates only instances of Item and Pointer monikers for use during the binding process. The moniker of the present invention is not WinAC specific and has no dependencies on any product. It can be used for any object that wants to be registered in the ROT. The ability to use the IParseDisplayName and IOleItemContainer interfaces is modeled after the File moniker and will work with any object that supports these interfaces. Their use, however, is optional and the moniker of the present invention can be used only to register and retrieve objects from the ROT.

Thus, the present invention provides a way to name objects that would otherwise stay unnamed. After that, the object can be called (i.e., located) by name. FIGS. 2A–2G set forth the C++ software implementation of the present invention, wherein:

FIG. 2A: Running.idl
  Contains the definition of the COM interfaces provided by the Running moniker.
  The interface defined by the Running moniker is:
    IRunning: An interface derived from the standard interface I dispatch
  The object "Running Moniker" provides the following interfaces:
    IRunning the interface defined within the file
    I ParseDisplayName a standard interface defined by Microsoft
    IUknown a standard interface defined by Microsoft FIG. 2B: Running.rgs
  This file contains the necessary registry entries for the Running Moniker.

FIG. 2C: Crunning.h
  This file contains the declaration of the C++ class, which implements the functionality of the Running Moniker.

FIGS. 2D–2G: Crunning.
  This file contains the actual implementation of the Running Moniker.
  The methods Register instanceName and Unregister instanceName are used to put in or remove the name of a running object into or from the table of running objects.
  The method ParseDisplayName searches the name of a registered object within this table and returns an object, which points to this object.

Figure 3:
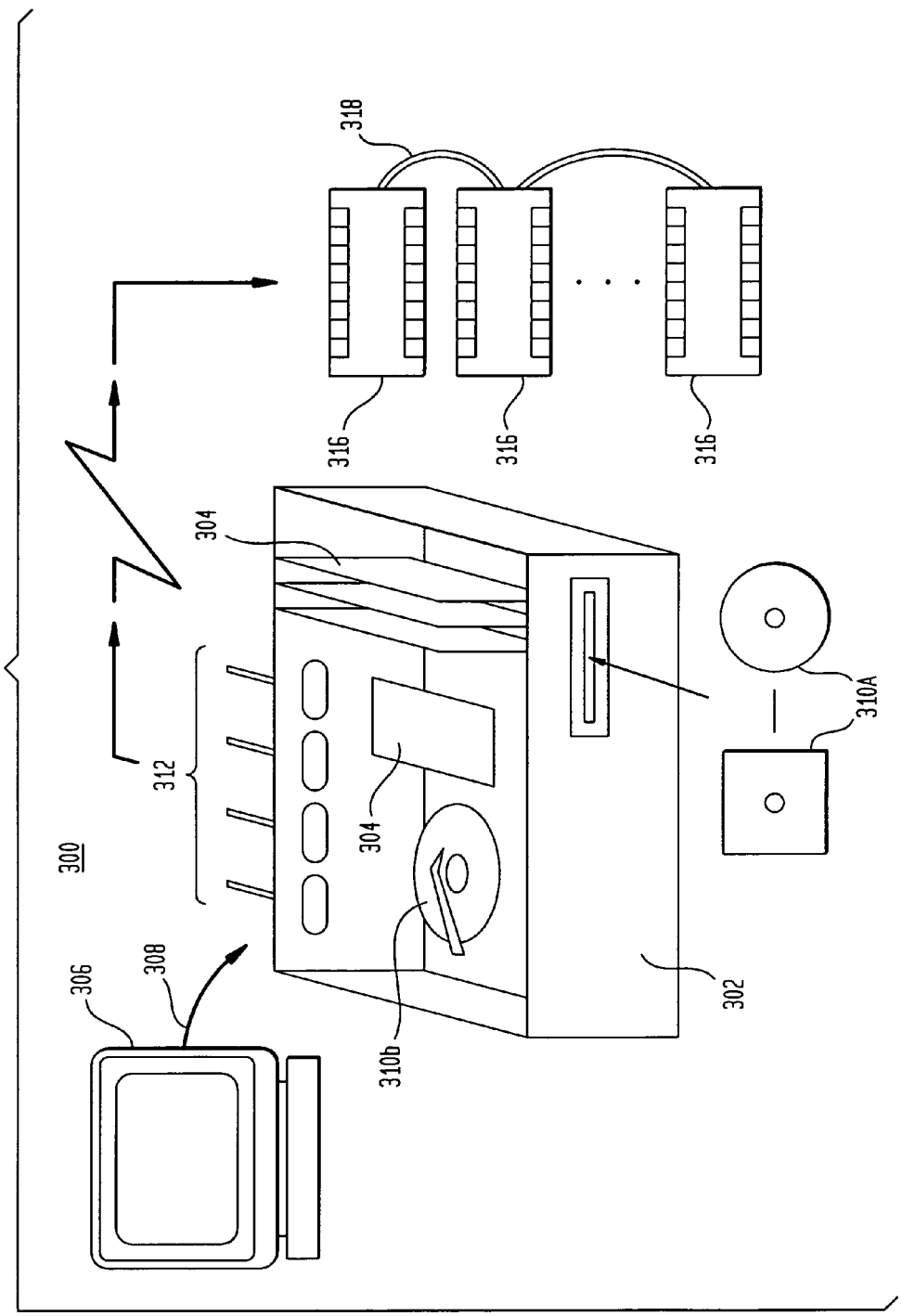
FIG. 3 illustrates the apparatus of the present invention.

It will be appreciated that the present invention may be practiced in other programming languages, or as an apparatus or article of manufacture as shown in FIG. 3. In more detail, FIG. 3 shows the system 300 of the present invention wherein a computer 302 (such as a personal computer (PC)) includes a processor 304, display 306 (and display connection 308), non-volatile memory 310A, B, remote connection(s) 312, ISA/MPI card(s) 314 and PLC(s) 316 (and connections 318). The moniker of the present invention may reside, as an article of manufacture, on the non-volatile memory 310A, B such as the disc(s) 310A (floppy, CD, DVD, etc.) or resident memory (hard disc, cache memory) 310B. The PC 301 is connected to PLC(s) 316, via a remote connection 312 (USB, COM, Internet, Intranet, Network, RS-232, etc.). The PLCs 316 may be daisy-chained together by a bus 318 in a master/slave relationship, for example. In another aspect, the PLC(s) may be interfaced with firmware 314 (ISA/MPI cards, etc.) that are provided by, for example, WinAC or Simatec whose function is to interface and communicate with the remote PLC(s) 316. The PLC(s) may also be provided in the form of firmware 314 installed in the slots.

It is possible that the moniker of the present invention be practiced as a dynamic link library (dll) that communicates through the communication ports (particularly, the USB port). In that case, the present invention may incorporate a well-known device driver (which one skilled in the art will appreciate how to implement) to achieve a high degree of communication between the processor 304 and the PLC(s) 316. For example, the connection may be the USB port and the driver may be an ActiveX™ device driver that drives the processor. One of the advantages of this arrangement is that the processor is driven directly, i.e., without the need for firmware.

In operation, the system in one aspect of FIG. 3 loads the moniker of the present invention from the non-volatile memory 310A,B. The processor 304, in order to access a PLC object, invokes the moniker of the present invention. The moniker retrieves the name of the desired PLC, either directly through the remote connection 312 or as provided by the interface of the firmware 314 that communicates with the PLC(s) 316. For example, an Excel™ client application instantiates the specific instance of the master PLC 316 using the moniker of the present invention. At this time, the Excel™ client has the pointer to the master PLC and may pass parameters therefrom/thereto. For example, the Excel™ client may retrieve operating data from the PLC(s) 316 and display the same in Excel™ format on the display 306. This last example is particularly useful where the PLC(s) do not otherwise have a convenient means of displaying data. It will be appreciated that, since the moniker of this present invention activates already-running objects, there is a security measure that an otherwise dormant PLC will not be erroneously activated which could disastrously effect connected machinery (i.e., motors), not shown.

The present invention is useful for instantiating specific instances of a soft PLC application such as provided by Simatic or WinAC (Siemens proprietary hardware/software). In such applications, the PLC may be unable to register itself in the operating system. The PLC(s) may not be able to register itself because it is remotely connected, for example, through a remote connection such as MPI, Universal Serial Bus, COM port, serial port (RS-232) or the like. The PLC may also be installed as firmware on a card such as MPI or ISA which has no traditional means to register objects. This is significant in a system connected to a plurality of PLCs, because it is necessary for the server to determine the specific PLC to access. Accessing the wrong PLC in a real-world environment could be disastrous In one particular soft PLC environment, the WinAC environment (proprietary software/hardware provided by Siemens), the moniker of the present invention is utilized to access specific PLC objects. In particular, it is a problem in WinAC to name service providers. At the core of the problem, WinAC uses the moniker "@WinAC". Problematically, the WinAC moniker names an implementation of the interface IVar rather than an instance. The moniker "@WinAC:default", while a more generic approach, assumes that only one IVar provider is located on a machine.

While at the present time only one IVar provider can run on a machine (either WinAC or the SlotPLC), it is undesirable to limit the system to only one provider.

In addition, the names of the implementations are part of the moniker. With the previous strategy, there is no way for the user to apply meaningful names (i.e. MyBigMachine) to objects in the system. If the user decides that a different implementation is required (for example, switch between WinAC and SlotPLC), the user must change the name of the server in the tagfile. This means that the user has to have the STEP7 (proprietary Siemens software/hardware) projects and be able to recreate the tagfile. The tagfile is a database within WinAC which stores the relationship between symbolic names (meaningful to the user) and absolute addresses within the process.

There is also a problem with object identity. When a client asks for "@WinAC", an IVar "session" object is returned. Problematically, each client has its own instance of IVar session object. This causes confusion because the use of the moniker implies that a client is connecting to a specific instance. The "session" objects are required to maintain state information such as server handles. Since the "session" objects maintain a state, they are not interfaces and some other means (namely, the present invention) should be provided to create them.

The moniker of the present invention resolves the foregoing problem of naming WinAC service providers by establishing a means by which the user names instances of objects. Using the named instance method disclosed herein, it would be possible to use the tagfile entry "MyBigMachine, MBO" to refer to MBO of whatever IVar server is named "MyBigMachine". This allows the user to change implementations without needing to change the tagfile. Indeed, any number of uniquely named instances can run simultaneously on one machine. Thus, clients can use the moniker of the present invention to connect to the correct instance.

Figure 4:
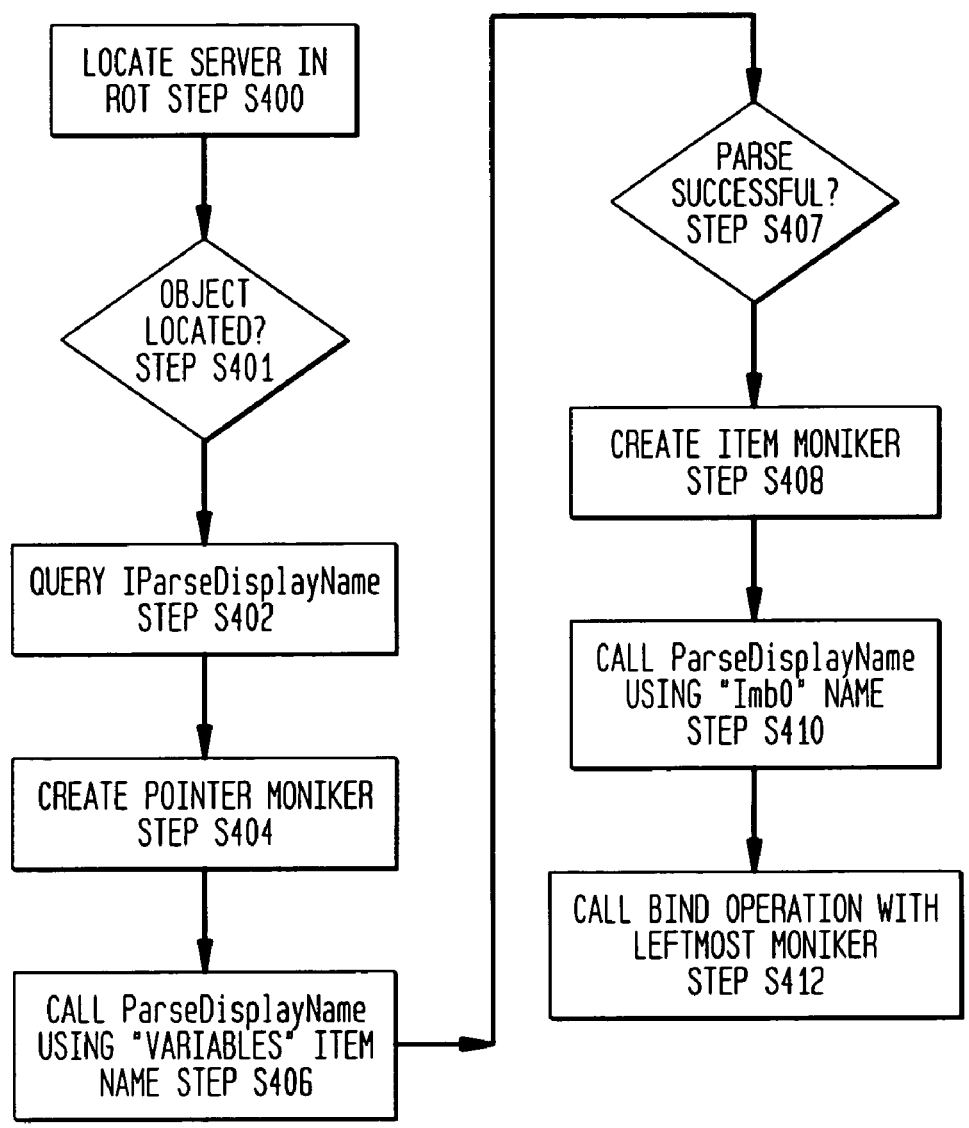
FIG. 4 is a flow diagram of the present invention.

The following example of the string "Running:MyBigMachineIvariablesImb0", as described with reference to FIG. 4, illustrates the manner in which the moniker of the present invention can be utilized in the WinAC situation.

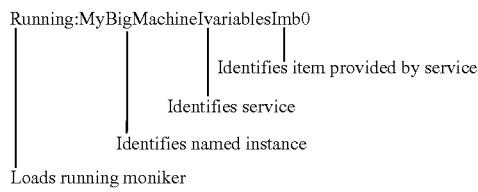

The moniker of the present invention uses the string "MyBigMachine" to locate the server in the ROT (Step S400). When the object is located (Step S401), it is queried for the interface IParseDisplayName (Step S402). A pointer moniker is then created for this object that will be used in the subsequent compose operations (Step S404). The ParseDisplayName method of IOleItemContainer is called with the item name "variables" (Step S406). If the operation is successful (Step S407), an item moniker is created which is then composed with the pointer moniker created above (Step S408). The resulting object is queried for IParseDisplayName and the method ParseDisplayName is called with the string "Imb0" (Step S410). With the exception of using a pointer moniker for the leftmost moniker in the bind operation (Step S412), the sequence of operations of the File moniker already described may be implemented hereafter.

The resulting moniker string definition of the WinAC implementation is shown below.

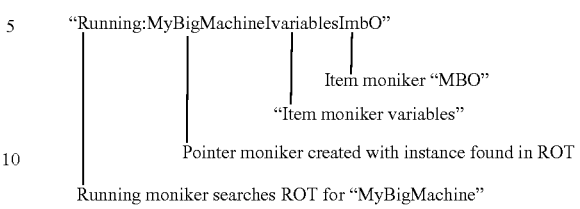

As will be understood from the foregoing string, the moniker of the present invention provides a pointer moniker for each partition of the string. In the situation where the object is a soft PLC object, the name of the object comes from an address specially allocated by the soft PLC. In WinAC, for example, the name comes from the MPI address which is allocated by the processor. The name may also come from the DMA channel, memory address, IRQ, or COM port.

It will be appreciated that the moniker in one aspect of the present invention connects to already running objects. Thus, a security measure, this ensures that an otherwise dormant PLC is not activated erroneously. The present invention provides a flexible and robust method for naming objects with monikers. The correct usage of these objects provided by the present invention allows for an extensible solution to activation problems. If a standard implementation is applied across all WinAC components, it will be easy to put the information needed to connect to a server in a database such as the tagfile. By making the servers into moniker providers, the problem of coordinating updates for parsers as components are changed (created by making the moniker parsers intelligent) will be avoided. In the model described, the moniker of the present invention does not require any knowledge of the various WinAC components. In any case, by having a consistent approach and eliminating special cases, problems are avoided in any environment.

What is claimed is:

1. A method comprising the steps of:
for a specific instance associated with a programmable logic controller comprising a first operating system, wherein said programmable logic controller is communicatively coupled to a server running under a second operating system on a personal computer:
determining that said specific instance is not registered with said second operating system and that said specific instance is already running under said first operating system; and
utilizing a moniker, automatically registering said specific instance with said second operating system, such that said specific instance, is accessible by said server by checking a running object table of said second operating system.

2. The method according to claim 1, wherein said step of registering does not instantiate objects that are not running such that a dormant programmable logic controller is not erroneously activated.

3. The method according to claim 1, further comprising: remotely coupling said programmable logic controller to said personal computer.

4. The method according to claim 3, wherein said step of remotely coupling couples said programmable logic controller to said personal computer over the internet.

5. The method according to claim 1, further comprising the step of obtaining a name of an object associated with said specific instance from a memory location allocated for said programmable logic controller.

6. The method according to claim 1, further comprising the step of parsing said moniker to generate a parsed display name.

7. The method according to claim 6, further comprising the step of creating a pointer moniker using said parsed display name.

8. The method of claim 7, further comprising the step of binding said pointer moniker to said server.

9. The method of claim 7, further comprising the step of creating an item moniker using a portion of said parsed display name to the right of a part corresponding to said pointer moniker.

10. The method of claim 6, further comprising the step of binding an item moniker to said server.

11. The method of claim 6, further comprising the step of recursively creating item monikers for items.

12. The method of claim 6, further comprising binding a leftmost portion of said parsed display name to said server.

13. A method comprising the steps of:
for a specific instance of an object associated with a first operating system, wherein said specific instance is not registered with a second operating system such that a server running under said second operating system is not able to normally access said specific instance:
 determining that said specific instance is not registered in a running object table of said second operating system and that said specific instance is already running under said first operating system; and
 utilizing a moniker, registering said specific instance with said second operating system such that said specific instance of said object, that was previously not registered with said second operating system such that said server was not able to normally access said specific instance, is accessible by said server by checking said running object table of said second operating system.

14. The method of claim 13, further comprising the step of converting a program ID to obtain a class ID of said specific instance.

15. The method of claim 14, further comprising the step of parsing said moniker to obtain a parsed moniker string.

16. The method of claim 15, further comprising the step of creating a pointer moniker to said specific instance using said parsed moniker string.

17. The method of claim 16, further comprising the step of binding said pointer moniker to said server.

18. The method of claim 17, further comprising the step of linking to said specific instance using said pointer moniker.

19. The method of claim 13, wherein said specific instance is associated with a programmable logic controller, wherein said step of registering registers said specific instance without changing a tagfile server name.

20. The method of claim 19, further comprising the step of binding a pointer moniker of said specific instance to a client.

21. An apparatus comprising:
a memory adapted to store a specific instance, said memory associated with a programmable logic controller that comprises a first operating system; and
a processor adapted to:
 register said specific instance with said first operating system; and
 via a moniker, provide access to said specific instance via a personal computer comprising a second operating system such that said specific instance is accessible by a server associated with said personal computer by accessing a running objects table of said second operating system.

22. The apparatus according to claim 21, further comprising a connection for remotely coupling said programmable logic controller to said personal computer.

23. The apparatus according to claim 22, wherein said connection is an internet connection.

24. The apparatus according to claim 22, wherein said connection is a Universal Serial Bus connection.

25. The apparatus of claim 22, wherein said connection is a communications (COM) port connection.

26. The apparatus of claim 21, further comprising a display for displaying signals associated with said specific instance.

27. The apparatus of claim 26, wherein said processor processes said signals associated with said specific instance to transform said signals into signals of a predetermined format defined by said server for display on said display.

28. The apparatus of claim 21, wherein said processor is adapted to establish a remote connection to couple said processor to said personal computer.

29. The apparatus of claim 21, further comprising a plurality of programmable logic controllers coupled to said processor.

30. The apparatus according to claim 29, further comprising a connection between said plurality of programmable logic controllers thereby forming a master-slave relationship in which a master programmable logic controller directs control of machinery coupled to a slave programmable logic controller.

31. The apparatus of claim 21, further comprising firmware for providing an interface between said processor and said personal computer.

32. The apparatus of claim 31, wherein said firmware provides identification information of said programmable logic controller that is used by the processor for registering said specific instance.

33. The apparatus of claim 31, wherein said firmware is on a pluggable card.

34. An apparatus comprising:
memory means adapted to store a specific instance, said memory associated with a programmable logic controller that comprises a first operating system; and
processor means adapted to:
 register said specific instance with said first operating system; and
 via a moniker, provide access to said specific instance via a personal computer comprising a second operating system such that said specific instance is accessible by a server associated with said personal computer by accessing a running objects table of said second operating system.

35. The apparatus according to claim 34, further comprising connection means for remotely coupling said programmable logic controller to said personal computer.

36. The apparatus according to claim 35, wherein said connection means is a means to connect to the internet.

37. The apparatus according to claim 35, wherein said connection means is a means to connect to a Universal Serial Bus connection.

38. The apparatus of claim 35, wherein said connection means is a means to connect to a communications (COM) port.

39. The apparatus of claim 34, further comprising display means for displaying signals associated with said specific instance.

40. The apparatus of claim 39, wherein said processor means processes said signals associated with said specific instance to transform said signals into signals of a predetermined format defined by said server for display on said display.

41. The apparatus of claim 34, wherein said processor means establishes a remote connection to couple said personal computer to said programmable logic controller.

42. The apparatus of claim 34, further comprising a plurality of programmable logic controllers coupled to said processor means.

43. The apparatus according to claim 42, further comprising a connection means for providing a connection between said plurality of programmable logic controllers thereby forming a master-slave relationship in which a master programmable logic controller directs control of machinery coupled to a slave programmable logic controller.

44. The apparatus of claim 34, further comprising firmware means for providing an interface between said processor means and said personal computer.

45. The apparatus of claim 44, wherein said firmware means provides identification information of said programmable logic controller that is used by the processor means for registering said specific instance.

46. The apparatus of claim 44, wherein said firmware means is on a pluggable card.

47. An article of manufacture encoded with processor instructions for activities comprising:
  for a specific instance of an object associated with a first operating system, wherein said specific instance is not registered with a second operating system such that a server of said second operating system is not able to normally access said specific instance:
    determining that said specific instance is not registered in a running object table of said second operating system and that said specific instance is already running under said first operating system; and
    utilizing a moniker, registering said specific instance with said second operating system such that said specific instance, that was previously not registered with said second operating system such that said server was not able to normally access said specific instance, is accessible by said server by checking said running object table of said second operating system.

48. The article of manufacture of claim 47, wherein the processor instructions encoded on said article of manufacture further comprises the activity of converting a program ID to obtain a class ID of said specific instance.

49. The article of manufacture of claim 48, wherein the processor instructions encoded on said article of manufacture further comprises the activity of parsing said moniker to obtain a parsed moniker string.

50. The article of manufacture of claim 49, wherein the processor instructions encoded on said article of manufacture further comprises the activity of creating a pointer moniker to said specific instance using said parsed moniker string.

51. The article of manufacture of claim 50, wherein the processor instructions encoded on said article of manufacture further comprises the activity of binding said pointer moniker to said server.

52. The article of manufacture of claim 51, wherein the processor instructions encoded on said article of manufacture further comprises the activity of linking to said specific instance using said pointer moniker.

53. The article of manufacture of claim 48, wherein said specific instance is associated with a programmable logic controller, wherein said activity of registering registers said specific instance without changing a tagfile server name.

54. The article of manufacture of claim 53, wherein the processor instructions encoded on said article of manufacture further comprises the activity of binding a pointer moniker of said specific instance to a client.

55. The method of claim 1, further comprising:
  registering said specific instance with said second operating system with a user-defined name.

56. The method of claim 1, further comprising:
  providing an interface to input/output points, wherein said programmable logic controller is adapted to provide data from said input/output points to said personal computer.

57. The apparatus of claim 34, wherein said processor is adapted to provide access to said specific instance via said second operating system with a user-defined name.

58. The apparatus of claim 34, further comprising:
  an interface means to input/output points, wherein said programmable logic controller is adapted to provide data from said input/output points via said specific instance to said personal computer.

* * * * *